United States Patent [19]

Holland et al.

[11] 3,888,644

[45] June 10, 1975

[54] FILTER-SEPARATOR APPARATUS

[75] Inventors: Robert F. Holland, Yokohama; Adrian J. Peterson, Tokyo, both of Japan

[73] Assignee: Black, Sivalls & Bryson, Inc., Houston, Tex.

[22] Filed: Dec. 3, 1973

[21] Appl. No.: 421,423

[52] U.S. Cl. .................. 55/318; 55/350; 55/478; 55/484; 55/492; 55/324
[51] Int. Cl. ......................................... B01d 50/00
[58] Field of Search ............ 55/324, 327, 334, 323, 55/350, 484, 482, 321, 319, 318, 315, 341, DIG. 23, DIG. 25, 502, 316, 387, 478

[56] References Cited
UNITED STATES PATENTS

| | | | |
|---|---|---|---|
| 686,813 | 11/1901 | Learned | 55/484 |
| 2,992,814 | 7/1961 | Maher | 55/482 X |
| 3,228,174 | 1/1966 | Perry, Jr. | 55/484 X |
| 3,349,547 | 10/1967 | Hoipkemeier | 55/324 |
| 3,646,730 | 3/1972 | Reid | 55/350 X |
| 3,760,568 | 9/1973 | Neumann et al. | 55/502 X |

OTHER PUBLICATIONS

"What's Going On Chemical Filtration," Bowser—Briggs Filtration Div., Cookeville, Tenn., p. 13.
"FlexoDisc and FlexoLeed Welded Bellows and Expansion Joints," Croll-Reynolds Eng. Co., Inc., Stamford, Conn., entire publication relied on.

*Primary Examiner*—Frank W. Lutter
*Assistant Examiner*—Kathleen J. Prunner
*Attorney, Agent, or Firm*—C. Clark Dougherty, Jr.

[57] ABSTRACT

The present invention relates to an improved filter-separator apparatus for removing solids and entrained liquids from a gas stream. The apparatus includes a horizontal vessel having partitions disposed therein which divide the vessel into three compartments. A gas stream inlet connection is connected to the vessel opening into the second compartment and a conduit is disposed within the second compartment sealingly attached to openings in the partitions so that the first and third compartments are communicated with each other by way of the conduit. First and second filter means are disposed within the second compartment connected through the partitions so that a gas stream entering the vessel by way of the gas stream inlet connection is split within the second compartment, one part passing through the first filter means into the first compartment, through the conduit and into the third compartment; and the other part flowing through the second filter means directly into the third compartment. A gas stream outlet connection is connected to the vessel which opens into the third compartment and liquid coalescing means are disposed within the third compartment so that the recombined gas stream within the third compartment flows through the liquid coalescing means and is withdrawn therefrom by way of the outlet connection.

8 Claims, 4 Drawing Figures

PATENTED JUN 10 1975  3,888,644

3,888,644

FILTER-SEPARATOR APPARATUS

BACKGROUND OF THE INVENTION

1. Field of the Invention

The present invention relates generally to an improved filter-separator apparatus, and more particularly, but not by way of limitation, to an improved separator apparatus for simultaneously filtering solid particles and separating entrained liquids from a gas stream.

2. Description of the Prior Art

Many various separator apparatus for removing solids and entrained liquids from gas streams have been developed and used. These apparatus are particularly useful in applications wherein a gas stream contains finely divided solid particles and entrained liquids which must be removed prior to further treatment or processing. For example, natural gas streams often contain foreign solids such as dirt and sand and entrained hydrocarbon liquids which must be removed prior to compressing the gas stream and/or otherwise treating it.

Heretofore, apparatus have been employed for removing solid particles and entrained liquids from gas streams which include filter means for removing the solid particles and mist extractors and other similar internal components for causing the separation and removal of entrained liquids. A filter-separator device of this type is described and claimed in U.S. Pat. No. 3,349,547 which is assigned to the assignee of the present invention. While such apparatus have been used successfully for the removal of solids and liquids from gas streams at normal flow rates and pressures, where high flow rates and pressures are encountered, e.g., 100–150 million standard cubic feet/hour at pressures of 1,500–2,500 psig, the apparatus must be extremely large and formed of heavy steel, and consequently, extremely expensive.

By the present invention an improved filter-separator apparatus is provided which is relatively small and economical as compared to prior apparatus for removing solids and entrained liquids from gas streams of high flow rates and/or pressures.

SUMMARY OF THE INVENTION

The present invention relates to an apparatus for separating solids and entrained liquids from a gas stream comprised of a horizontal vessel having forward and rearward ends. A first partition having a plurality of openings therein is disposed in the vessel so that a first compartment is formed at the forward end thereof, and a second partition having a plurality of openings therein is disposed in the vessel positioned between the first partition and the rearward end of the vessel so that a second compartment is formed between the first and second partitions and a third compartment is formed at the rearward end of the vessel. A conduit having forward and rearward ends disposed in the second compartment, the forward end being sealingly attached to an opening in the first partition and the rearward end being sealingly attached to an opening in the second partition thereby communicating the first and third compartments with each other. A first filter means is provided in the second compartment connected to openings in the first partition so that gas passing through the first filter means is caused to flow through the openings in the first partition into the first compartment, then through the conduit and into the third compartment. A second filter means is provided in the second compartment connected to openings in the second partition so that gas passing through the second filter means is caused to flow directly into the third compartment. An inlet connection is attached to the vessel opening into the second compartment for introducing the gas stream therein, and an outlet connection is attached to the vessel opening into the third compartment for removing gas therefrom. Liquid coalescing means are secured within the third compartment and positioned so that gas passing through the third compartment is caused to flow through the liquid coalescing means prior to flowing through the outlet connection, and means for removing separated liquids from the vessel are attached thereto.

It is, therefore, an object of the present invention to provide an improved filter-separator apparatus.

A further object of the present invention is the provision of a filter-separator apparatus for removing solid particles and entrained liquids from a high flow rate-high pressure gas stream, which apparatus is relatively small and economical.

Yet a further object of the present invention is the provision of an improved high capacity filter-separator apparatus wherein access is provided for maintaining and replacing the filter elements and other removable internal components of the apparatus by way of only one conventional access connection thereby eliminating the need for multiple or large and expensive closures for such purpose.

Another object of the present invention is the provision of a separator apparatus for removing solid particles and entrained liquids from high flow rate-high pressure gas streams wherein a vessel of minimum diameter containing a maximum number of filter elements is utilized.

Other and further objects, features and advantages of the invention will be readily apparent to those skilled in the art from a reading of the description of preferred embodiments which follows when taken in conjunction with the accompanying drawings.

DESCRIPTION OF PREFERRED EMBODIMENTS

Figures 1, 2, 3, 4:
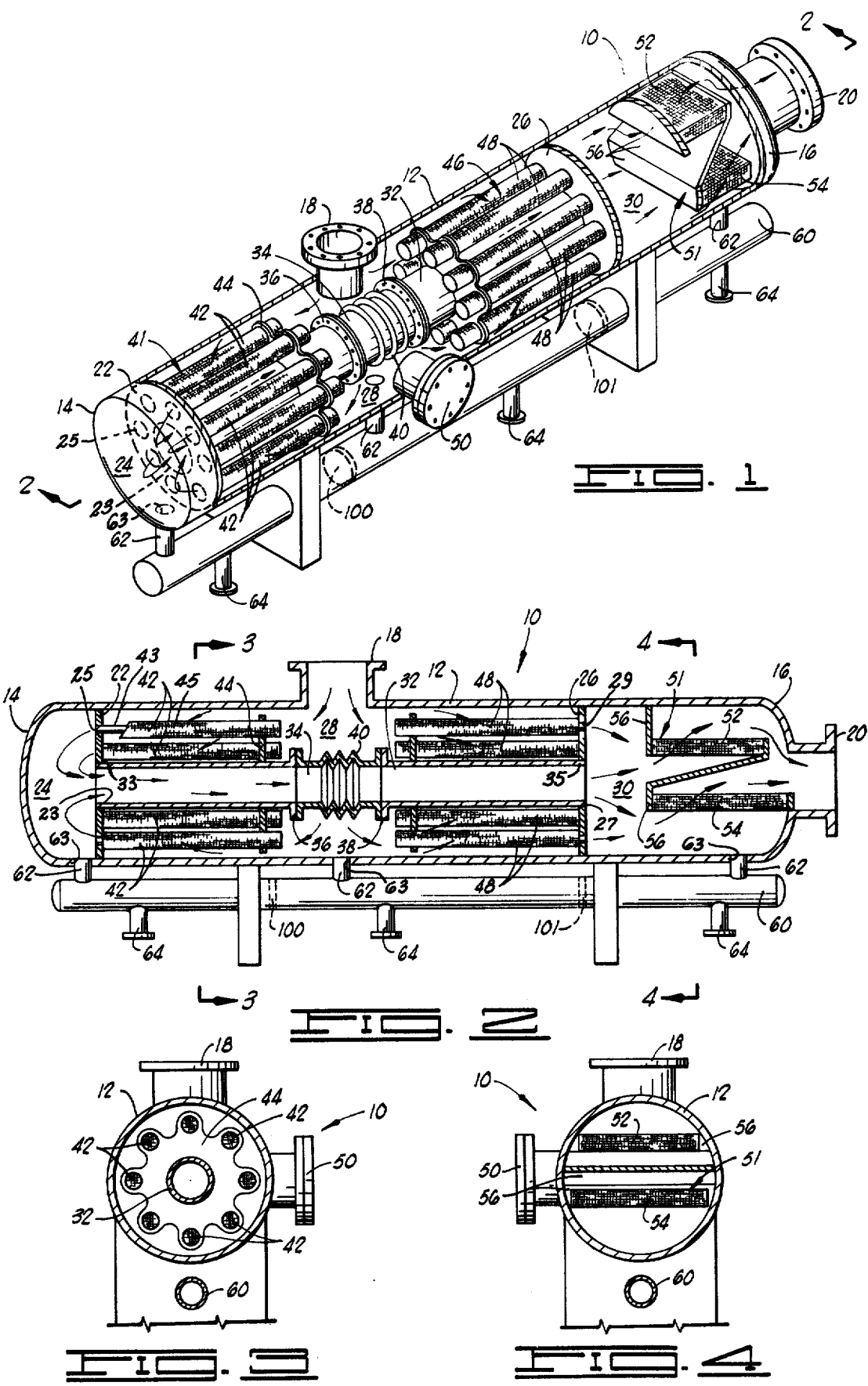
FIG. 1 is a partly sectional perspective view of the improved filter-separator apparatus of the present invention.
FIG. 2 is a side elevational view of the apparatus of FIG. 1 in cross-section.
FIG. 3 is a cross-sectional view taken along line 3—3 of FIG. 2.
FIG. 4 is a cross-sectional view taken along line 4—4 of FIG. 2.

Referring now to the drawings, the filter-separator apparatus of the present invention is illustrated and generally designated by the numeral 10. The apparatus 10 is comprised of a closed vessel 12 having a forward end 14 and a rearward end 16. An inlet connection 18 is attached to a side wall of the vessel 12 at a point intermediate the ends thereof and an outlet connection 20 is provided attached to the rearward end 16. The inlet and outlet connections 18 and 20 may include conventional flanges as illustrated in the drawings, or they may be beveled for welding directly to inlet and outlet piping.

As best shown in FIGS. 1 and 2, a first partition 22 having a central opening 23 disposed therein and a plurality of smaller openings 25 disposed therein positioned in spaced relationship around the central opening is attached within the vessel 12 near the forward end 14 thereof so that a first compartment 24 is formed in the forward end 14. A second partition 26 which also includes the central opening 27 and a plurality of smaller openings 29 positioned in spaced relationship around the central opening is attached within the vessel 12 at a point between the first partition 22 and the end 16 of the vessel 12 so that a second compartment 28 is formed between the first partition 22 and the second partition 26, and a third compartment 30 is formed at the rearward end of the vessel 12. As will be understood, the partitions 22 and 26 are seal welded or otherwise sealingly attached to the inside periphery of the vessel 12.

A conduit 32 having forward and rearward ends 33 and 35 respectively is disposed within the second compartment 28, preferably in a manner such that the axis of the conduit 32 coincides with the axis of the vessel 12. The ends 33 and 35 of the conduit 32 are sealingly attached to the central openings 23 and 27 respectively in the partitions 22 and 26 such as by welding so that the first and third compartments 24 and 30 are communicated with each other by way of the conduit 32. The conduit 32 further includes a removable center portion 34 for providing access to within the conduit 32 and to within the first and third compartments 24 and 30. A variety of connectors may be utilized in conjunction with the removable portion 34 of the conduit 32, as for example, conventional flanges 36 and 38. In addition, a conventional expansion joint 40 may be utilized in the removable section 34 of the conduit 32 to facilitate easy assembly and disassembly of the connections 36 and 38.

A first filter means generally designated by the numeral 41 is disposed within the second compartment 28 of the vessel 12 connected to openings 25 of the partition 22. Preferably, the first filter means 41 is comprised of a plurality of conventional filter elements 42 positioned parallel to the axis of the vessel 12 within the annular area between the conduit 32 and the side wall of the vessel 12. As will be understood by those skilled in the art, the filter elements 42 can take a variety of forms, but generally are each comprised of an elongated tubular member 43 (FIG. 2) having a plurality of perforations disposed therein along the length thereof (not shown) with removable filtration media 45 disposed over and around the tubular member 43. The forward end of each of the tubular members of the elements 42 are sealingly connected to the openings 25 in the partition 22 such as by welding and the other end of the tubular members are closed. The removable filtration media, generally finely woven clothlike material, are positioned over the tubular members and are held in place by a support member 44 attached to the conduit 32.

A second filter means generally designated by the numeral 46 is provided within the second compartment connected to the openings 29 in the partition 26. Like the first filter means 41, the second filter means 46 is preferably comprised of a plurality of conventional filter elements 48 positioned parallel to the axis of the conduit 32 within the annular area between the conduit 32 and the walls of vessel 12 adjacent the partition 26.

As described above in connection with the filter elements 42, the elements 48 include perforated tubular members (not shown) sealingly attached to the openings 29 in the partition 26 at one end and covered with removable filtration media.

A conventional access connection or manway 50 is attached to the vessel 12 for providing access into the second compartment 28.

Conventional liquid coalescing means generally designated by the numeral 51 are attached within the third compartment 30. Preferably, the liquid coalescing means 51 are comprised of a pair of conventional wire mesh mist extractor pads 52 and 54 positioned longitudinally one above the other. A plurality of baffles 56 are attached to the pads 52 and 54 and to the walls of the vessel 12 in a conventional manner so that gas flowing through the compartment 30 of the vessel 12 is caused to flow through the pads 52 and 54 prior to being withdrawn from the vessel 12 by way of the outlet connection 20.

A liquid accumulator vessel 60 is provided positioned below the vessel 12 and connected thereto by a plurality of conduits 62. The conduits 62 are connected to openings 63 provided in the bottom of the side wall of the vessel 12 such as by welding so that they communicate with the compartments 24, 28 and 30 therein. Outlet connections 64 are attached to the vessel 60 for removing accumulated liquids therefrom, and as will be understood, one or more conventional liquid level control assemblies (not shown) are utilized with the vessel 60 for automatically causing the removal of liquid therefrom. Plates 100 and 101 in vessel 60 prevent communication between the compartments 24, 28 and 30 and prevent undesirable short-circuiting (bypassing) of gas flow around the filter elements 42 and 48.

Operation of the Apparatus 10

In operation of the apparatus 10, an inlet gas stream containing foreign solid particles and entrained liquids enters the second compartment 28 by way of the inlet connection 18. As shown by the arrows in FIGS. 1 and 2, the inlet gas stream splits within the second compartment 28 so that a portion thereof passes through the first filter means 41 and a portion through the second filter means 46. That is, a portion of the gas stream flows through the filter media covering the tubular members of the elements 42, through the perforations provided in the tubular members and through the tubular members into the first compartment 24. As the gas passes through the filter media of the elements 42, solid particles contained therein are filtered out on the surfaces of the filtration media and the resulting solid-free gas passes through the partition 22 into the first compartment 24. From the first compartment 24 the gas flows through the conduit 32 into the third compartment 30.

The other portion of the gas stream entering the second compartment 28 by way of the inlet connection 18 flows through the filter means 46 directly into the third compartment 30. That is, the gas flows through the filter media and tubular members of the elements 48 whereby solids contained therein are removed and through the partition 26 into the compartment 30 whereupon it combines with the gas entering the compartment 30 by way of the conduit 32. As will be understood, portions of entrained liquids in the inlet gas stream are removed therefrom as it passes through the filter means 41 and 46. Entrained liquids remaining in the recombined gas stream flowing through the third compartment 30 are removed by the liquid coalescing means 51 disposed therein. That is, as the gas stream passes through the third compartment 30 it is caused to flow through the mist extractor pads 52 and 54 which function to remove the remaining entrained liquids. The resulting gas stream, free of solids and entrained liquids flow out of the vessel 12 by way of the outlet connection 20.

Liquids agglomerated on the filter elements 42 and 48 and mist extractor pads 52 and 54 gravitate downwardly within the vessel 12, accumulate within the compartments 24, 28 and 30 thereof and are withdrawn by way of the conduits 62 connected to the accumulator vessel 60. As stated above, the removed liquids which accumulate in the vessel 60 are removed therefrom by way of the connection 64 attached thereto.

Because the apparatus 10 of the present invention brings about the splitting of the inlet gas stream into two portions which flow through separate filter means, the diameter of the vessel 12 required for handling a particular flow rate of gas is relatively small as compared to the diameter of heretofore used apparatus wherein all of the gas is caused to flow through a single bank of filter elements. Consequently, the thickness of the steel required for the apparatus of the present invention to contain high pressure gas streams is less than prior apparatus making the present invention less costly.

When it is necessary to maintain the internal components of the apparatus 10, i.e., replace the filtration media of the filter elements 42 and 48 within the second compartment 28, the access connection 50 is utilized. If it is necessary to inspect or replace the liquid coalescing means 51, or other components within the vessel 12, the removable portion 34 of the conduit 32 is removed so that one or more men can crawl through the conduit 32 and thereby gain access to the first compartment 28 and third compartment 30.

Thus, the filter-separator apparatus of the present invention is well adapted to carry out the objects and attain the ends and advantages mentioned as well as those inherent therein. While presently preferred embodiments of the invention have been given for the purpose of disclosure, numerous changes in the detail of construction and the combination, shape, size and arrangement of parts may be resorted to without departing from the spirit and scope of the invention as hereinafter claimed.

What is claimed is:

1. Apparatus for separating solids and entrained liquids from a gas stream which comprises:
    a closed horizontal vessel having forward and rearward ends;
    a first upright partition having at least first and second openings therein attached within said vessel so that a closed first compartment is formed at the forward end thereof;
    a second upright partition having at least first and second openings therein attached within said vessel positioned between said first partition and the rearward end of said vessel so that a closed second compartment is formed between said first and second partitions and a closed third compartment is formed at the rearward end of said vessel;
    a conduit having forward and rearward ends disposed within said second compartment, the forward end being sealingly attached to said first opening in said first partition and the rearward end being sealingly attached to said first opening in said second partition thereby communicating said first and third compartments with each other by way of said conduit;
    a first filter means disposed within said second compartment and sealingly connected to said second opening in said first partition so that gas passing through said first filter means is caused to flow through said second opening of said first partition into said first compartment, and then through said conduit into said third compartment;
    a second filter means disposed in said second compartment and sealingly connected to said second opening in said second partition so that gas passing through said second filter means is caused to flow through said second opening in said second partition into said third compartment;
    an inlet connection attached to said vessel and opening into said second compartment for introducing said gas stream therein;
    an outlet connection attached to said vessel and opening into said third compartment for withdrawing gas therefrom;
    liquid coalescing means secured within said third compartment and positioned so that gas passing through said third compartment is caused to flow through said liquid coalescing means prior to being withdrawn from said vessel by way of said outlet connection; and
    at least one liquid outlet connection attached to said vessel for removing separated liquid therefrom.

2. The apparatus of claim 1 wherein each of said first and second filter means comprises:
    a tubular member sealingly connected to said second opening at one end and closed at the other end having a plurality of perforations disposed therein along the length thereof; and
    filtration media covering said tubular member.

3. The apparatus of claim 2 wherein said liquid coalescing means secured within said third compartment comprises:
    at least one wire mesh pad; and
    baffle means for causing gas flowing through said third compartment to flow through said wire mesh pad secured thereto and to the walls of said vessel.

4. The apparatus of claim 3 further including:
    a liquid accumulator positioned below said vessel, said accumulator including a liquid outlet connection and at least one liquid inlet connection disposed therein; and
    conduit means connecting said liquid outlet connection of said vessel and said liquid inlet connection of said accumulator.

5. The apparatus of claim 4 further including:
    an access connection attached to said vessel and opening into said second compartment thereof; and
    said conduit disposed within said second compartment including a removable section for providing access to within said conduit.

6. A separator for removing solid particles and entrained liquids from a gas stream which comprises:

a closed horizontal vessel having forward and rearward ends;

a first upright partition having a central opening and a plurality of smaller openings positioned in spaced relationship around said central opening attached within said vessel so that a closed first compartment is formed in the forward end thereof;

a second upright partition having a central opening and a plurality of smaller openings positioned in spaced relationship around said central opening attached within said vessel so that a closed second compartment is formed between said first and second partitions and a closed third compartment is formed at the rearward end of said vessel;

a conduit having forward and rearward ends disposed within said second compartment, the forward end being sealingly attached to said central opening in said first partition and the rearward end being sealingly attached to the central opening in said second partition thereby communicating said first and third compartments, said conduit including a removable section positioned therein;

a first plurality of filter elements disposed within said second compartment connected to said smaller openings in said first partition so that gas passing through said plurality of filter elements is caused to flow through said smaller openings into said first compartment, and then through said conduit into said third compartment;

a second plurality of filter elements disposed within said second compartment connected to said smaller openings in said second partition so that gas passing through said second plurality of filter elements is caused to flow through said smaller openings into said third compartment;

a gas stream inlet connection attached to said vessel and opening into said second compartment at a location betwen said first and second pluralities of filter elements disposed therein;

an access connection attached to said vessel and opening into said second compartment;

an outlet connection attached to said vessel and opening into said third compartment for withdrawing gas therefrom;

liquid coalescing means secured within said third compartment so that gas passing through said third compartment is caused to flow through said liquid coalescing means prior to being withdrawn by way of said outlet connection; and at least one liquid outlet connection attached to said vessel for removing separated liquids therefrom.

7. The apparatus of claim 6 wherein each of said filter elements comprises:

a tubular member sealingly connected to said second opening at one end and closed at the other end having a plurality of perforations disposed therein along the length thereof; and filtration media covering said tubular member.

8. The apparatus of claim 7 wherein said liquid coalescing means secured within said third compartment comprises:

at least one removable wire mesh pad; and baffle means for causing gas flowing through said third compartment to flow through said wire mesh pad secured thereto and to the walls of said vessel.

* * * * *